United States Patent
Shi et al.

(10) Patent No.: US 9,130,457 B2
(45) Date of Patent: Sep. 8, 2015

(54) CONTROL LOGIC FOR SWITCHES COUPLED TO AN INDUCTOR

(71) Applicant: QUALCOMM Incorporated, San Diego, CA (US)

(72) Inventors: Song S Shi, San Diego, CA (US); Lennart Karl-Axel Mathe, San Diego, CA (US); Yunfei Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 13/659,682

(22) Filed: Oct. 24, 2012

(65) Prior Publication Data
US 2014/0111170 A1 Apr. 24, 2014

(51) Int. Cl.
*H02M 3/158* (2006.01)
*H02M 3/157* (2006.01)
*H02M 3/156* (2006.01)
*H02M 1/00* (2007.01)

(52) U.S. Cl.
CPC ............ *H02M 3/1588* (2013.01); *H02M 3/156* (2013.01); *H02M 3/157* (2013.01); *H02M 2001/0009* (2013.01); *Y02B 70/1466* (2013.01)

(58) Field of Classification Search
CPC ... H02M 3/156; H02M 3/157; H02M 3/1588; G05F 1/613
USPC .......... 323/222, 223, 271, 282, 283, 284, 285
See application file for complete search history.

(56) References Cited

U.S. PATENT DOCUMENTS

| | | | | |
|---|---|---|---|---|
| 5,949,229 A * | 9/1999 | Choi et al. | ..................... | 323/320 |
| 6,657,417 B1 * | 12/2003 | Hwang | ......................... | 323/222 |
| 6,984,963 B2 * | 1/2006 | Pidutti et al. | ................... | 323/207 |
| 7,116,090 B1 * | 10/2006 | Yang et al. | ..................... | 323/288 |
| 7,557,551 B1 * | 7/2009 | Somerville et al. | ........... | 323/282 |
| 7,638,994 B2 * | 12/2009 | Hane et al. | ..................... | 323/285 |
| 7,724,553 B2 | 5/2010 | Wong et al. | | |
| 7,802,113 B2 | 9/2010 | Westwick et al. | | |
| 8,102,676 B2 * | 1/2012 | Huynh et al. | ............... | 363/21.01 |
| 8,164,391 B2 | 4/2012 | Huynh | | |
| 8,541,990 B2 * | 9/2013 | Lee et al. | ....................... | 323/207 |

(Continued)

FOREIGN PATENT DOCUMENTS

| | | |
|---|---|---|
| JP | 2012065430 A | 3/2012 |
| WO | WO-2012044391 A1 | 4/2012 |

OTHER PUBLICATIONS

International Search Report and Written Opinion—PCT/US2013/066704—ISA/EPO—Feb. 4, 2014.

*Primary Examiner* — Jue Zhang
*Assistant Examiner* — Lakaisha Jackson
(74) *Attorney, Agent, or Firm* — James Gutierrez (57) ABSTRACT

Simple and efficient techniques for closed loop control of a boost converter. In an aspect, a current feed-forward (CFF) mode of operation includes providing current information to a control logic block controlling transistor switches of the boost converter to advantageously smooth the signals present in the closed loop control of the system. In another aspect, a modified peak current (MPC) mode of operation includes providing a simplified control mechanism based on a peak current mode of operation. Both CFF mode and MPC mode may share similar circuit elements, allowing a single implementation to selectively implement either of these modes of control. Further techniques are provided for determining average current information for the logic block.

17 Claims, 11 Drawing Sheets

(56) References Cited

U.S. PATENT DOCUMENTS

2006/0125455 A1 6/2006 Tiew et al.
2009/0243577 A1 10/2009 Lim
2010/0213911 A1* 8/2010 Oki .............................. 323/283
2010/0283441 A1 11/2010 Wang et al.
2011/0285370 A1 11/2011 Gritti
2013/0278237 A1* 10/2013 Saint-Pierre ................. 323/283

* cited by examiner (PRIOR ART)
FIG 1

CONTROL LOGIC FOR SWITCHES COUPLED TO AN INDUCTOR

BACKGROUND

1. Field

The disclosure relates to techniques for controlling boost converters to generate a desired output voltage.

2. Background

Boost converters are commonly employed to generate a voltage supply level higher than the available battery voltage level. A boost converter may incorporate switches configured by a control block to alternately charge and discharge an inductor. The charged inductor may supply an output voltage to a load, and the level of the output voltage may be regulated using a feedback mechanism in or coupled to the control block.

Prior art control techniques for a boost converter include burst mode (BM) control and peak current mode (PCM) control. According to BM control, the switches are configured to be activated whenever the output voltage drops below a certain threshold level. According to PCM control, the peak current through a switch is sampled and controlled using the control loop to obtain the desired output voltage. BM control may suffer from potential loop instability arising from the presence of two integrators (i.e., a capacitor and an inductor) in the loop path, while PCM control may be undesirably complex as it may require a large number of circuit blocks to implement.

It would be desirable to provide efficient and robust techniques for controlling the operation of boost converters.

BRIEF DESCRIPTION OF THE DRAWINGS

FIG. 9 illustrates an exemplary circuit implementation of a scheme for averaging I_N1 when N1 is on.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. In this specification and in the claims, the terms "module" and "block" may be used interchangeably to denote an entity configured to perform the operations described.

Note in this specification and in the claims, the denotation of a signal or voltage as being "high" or "low" may refer to such signal or voltage being in a logical "high" or "low" state, which may (but need not) correspond to a "TRUE" (e.g., =1) or "FALSE" (e.g., =0) state for the signal or voltage. It will be appreciated that one of ordinary skill in the art may readily modify the logical conventions described herein, e.g., substitute "high" for "low" and/or "low" for "high," to derive circuitry having functionality substantially equivalent to that described herein. Such alternative exemplary embodiments are contemplated to be within the scope of the present disclosure.

Figure 1:
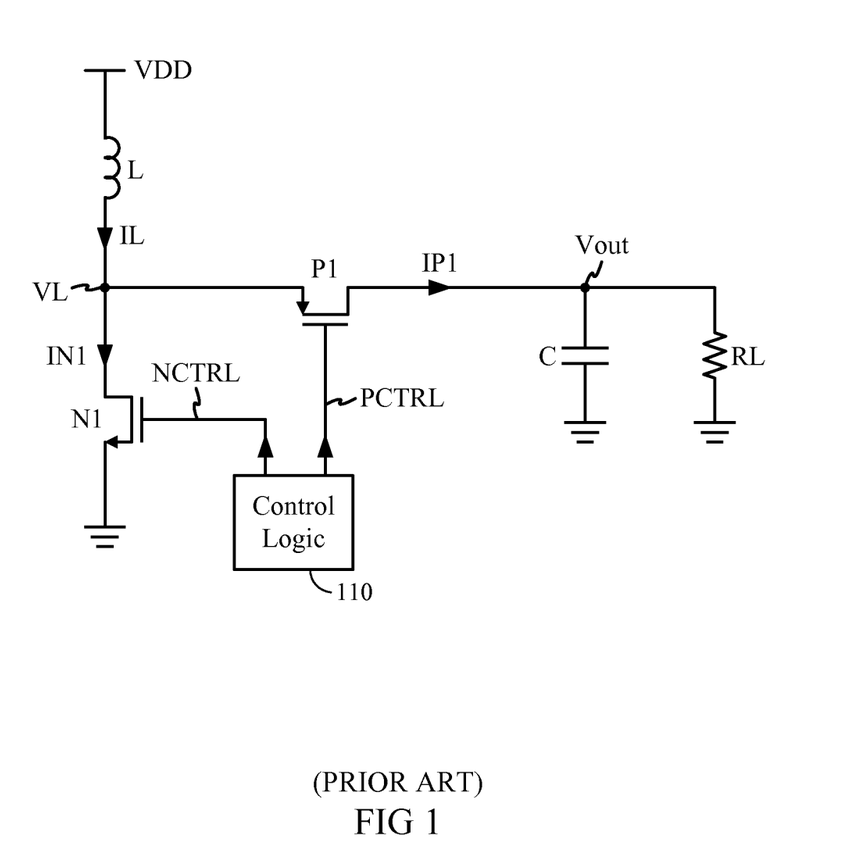
FIG. 1 illustrates a boost converter known in the prior art.

FIG. 1 illustrates a boost converter 100 known in the prior art. Note FIG. 1 is shown for illustrative purposes only, and is not meant to limit the scope of the present disclosure to any particular type of boost converter explicitly shown.

In FIG. 1, a boost inductor L is coupled to a voltage source VDD at one end, and at the other end to a high-side switch transistor P1 and a low-side switch transistor N1. N1 is configured by the control signal NCTRL to alternately couple or decouple the inductor L to or from ground. Similarly, P1 is configured by the control signal PCTRL to alternately couple or decouple the inductor L to or from an output voltage Vout. Vout is coupled to a load modeled as resistance RL, and a storage capacitor C. Per principles of operation known to one of ordinary skill in the art, by configuring the switches N1, P1 using NCTRL, PCTRL, the boost converter 100 may generate an output voltage Vout that is higher than the source voltage VDD. In the implementation shown, NCTRL and PCTRL are generated by a control logic block 110.

During operation, the block 110 may, e.g., program the duty cycles and frequencies at which N1 and P1 are turned on and off to generate a particular target output voltage Vout. In particular, when N1 is turned on (and P1 is turned off) during a "charging phase," the inductor current IL starts increasing, and energy is stored in the inductor. When P1 is turned on (and N1 is turned off) during a "discharging phase," the energy stored in the inductor is discharged into the output capacitor C and load RL.

Under certain operating conditions, a surge current drawn by the load RL may cause a sudden drop in Vout. In this case, the inductor current IL will need to be replenished before the charge in C can be brought back to support levels of Vout required for normal operation. For example, a surge current of 500 mA to the load RL for a 1 µsec duration may cause a 5 µF capacitor C to experience a 100 mV drop in Vout. The time needed to replenish IL in such a case may undesirably delay the return of the output voltage Vout to the desired target level.

In a prior art algorithm for boost converter control known as burst mode (BM) control, the control logic 110 may start switching N1 and P1 to charge C whenever the output voltage Vout is below a certain set point, e.g., Vok_th. Per BM control, the control logic 110 may stop switching (e.g., turn both switches N1, P1 off) when the output voltage Vout is above the set point. In an implementation, a measure of the current IP1 through P1 may be provided to the control logic 110, and block 110 may be configured to turn off P1 when IP1 is found to flow in a negative direction (e.g., flow from Vout to VL). Furthermore, a measure of the current IN1 through N1 may be provided to the control logic block 110, and block 110 may be configured to turn off N1 and stop charging L when IN1 exceeds a certain limit. Per BM control, the switching of N1 and P1 will be seen to occur in "bursts," since there are two integrators (i.e., the inductor L and the capacitor C) operating in the control loop.

In general, BM control may be characterized as a second-order unstable system, and the output voltage Vout may be bursty in nature, as no current information is included in the control system. It will be appreciated that the inductor current IL also has a bursty nature, as BM control does not incorporate current information in the control scheme, and BM control results in relatively large peak inductor current. To minimize noise in the boost converter, it would be desirable to decrease the peak inductor current, as larger peak inductor current would lead to higher levels of magnetic coupling due to larger AC current through N1, P1, and the capacitor.

In another prior art algorithm for boost converter control known as peak current (PC) mode control, the control logic 110 may turn on N1 in response to detecting an edge (e.g., rising or falling) of a clock signal (not shown in FIG. 1). The transition to N1 off (and P1 on) may be triggered by the output of a comparator (not shown), which compares the difference between Vout and a reference voltage Vref with IN1 superimposed on a ramp waveform. While PC mode control generally ensures that the output voltage Vout is well-regulated, and includes slope compensation to accommodate relatively large duty cycles, it will be appreciated that the design of a PC mode control system is relatively complicated. In particular, PCM control requires a large number of elements, e.g., an error amplifier to keep Vout well-regulated, slope compensation for large duty cycles, and a pulse skip (PS) comparator (not shown in FIG. 1) to detect a pulse skip scenario.

In view of the above considerations, it would be desirable to provide a control mechanism for boost converters that is simple and efficient to implement, and which simultaneously affords accurate and high-bandwidth regulation of the output voltage Vout.

Figure 2:
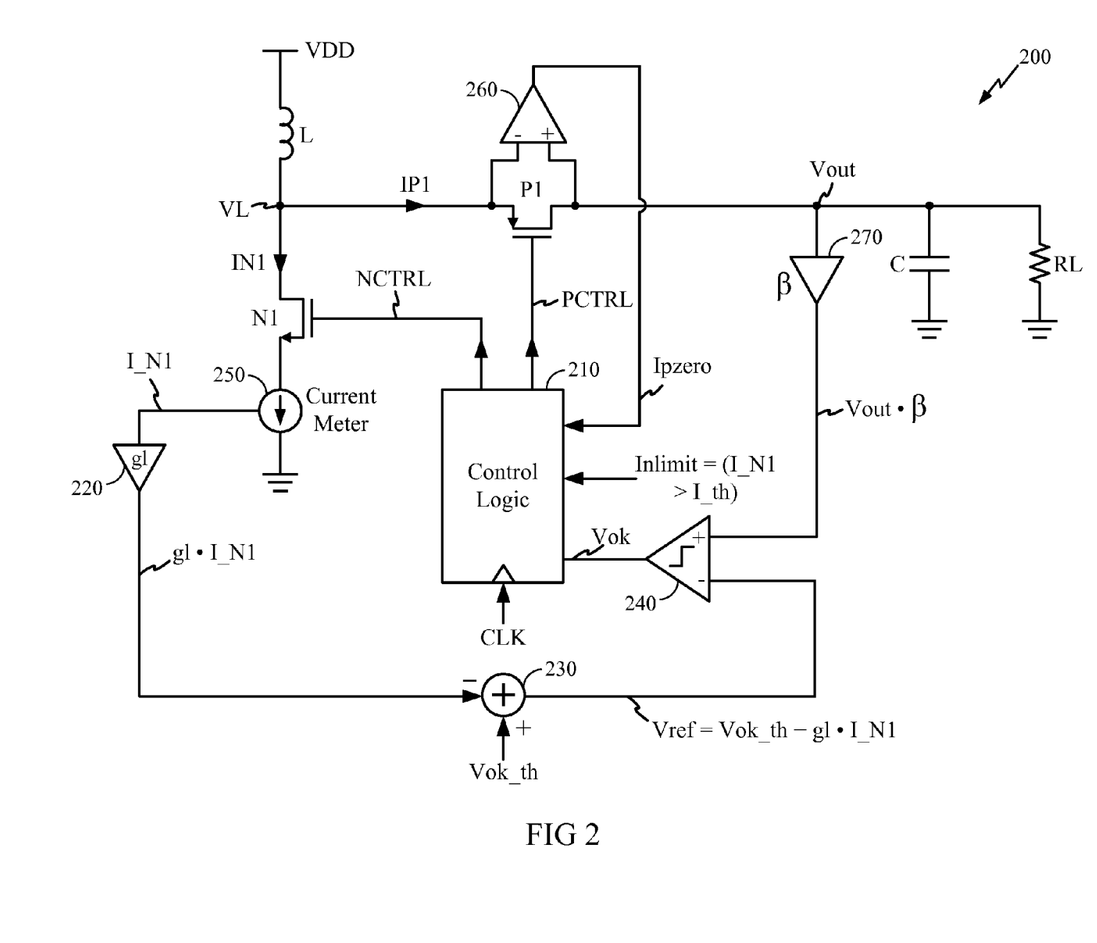
FIG. 2 illustrates an exemplary embodiment of a boost converter control scheme according to the present disclosure.

FIG. 2 illustrates an exemplary embodiment 200 of a boost converter control scheme according to the present disclosure. Note FIG. 2 is shown for illustrative purposes only, and is not meant to limit the scope of the present disclosure to circuit elements explicitly shown in FIG. 2.

In FIG. 2, the boost converter 200 includes a control logic block 210 that controls the gate voltages NCTRL, PCTRL of switch transistors N1, P1, respectively. The logic block 210 is driven by a clock CLK. A current meter 250 is provided that measures the current IN1 through N1 as I_N1, and provides a conversion gain g1 to I_N1 using amplifier 220 to generate a voltage g1·I_N1 at a negative (−) input of an adder 230. The adder 230 subtracts (g1·I_N1) from a threshold voltage Vok_th to generate a voltage Vref. Following the generation of Vref, a limiting comparator 240 compares Vref to a voltage β·Vout derived from Vout, wherein β is the gain of an amplifier/buffer 270. The output of comparator 240 is labeled Vok, and is further provided to the logic block 210 to aid in the control of switches P1, N1.

Note in FIG. 2, a voltage Ipzero is further generated by comparator 260 to indicate the directionality of current IP1 through P1. In the exemplary embodiment shown, Ipzero will equal 1 when IP1<=0, and will equal 0 when IP1>0. A voltage Inlimit is further generated indicating whether the measured current I_N1 is greater than a threshold I_th. Note in alternative exemplary embodiments, the signals Ipzero and Inlimit may be generated or derived using alternative techniques (not shown in FIG. 2), e.g., the directionality and/or magnitude of the currents through P1 and N1 may be measured using other types of current sensing techniques known in the art. Such alternative exemplary embodiments are contemplated to be within the scope of the present disclosure.

According to the present disclosure, the control logic block 210 may be configured to operate in a current feed forward (CFF) mode or a modified peak current (MPC) mode using the circuitry shown in FIG. 2, as further described hereinbelow with reference to FIGS. 3 and 4.

Figure 3:
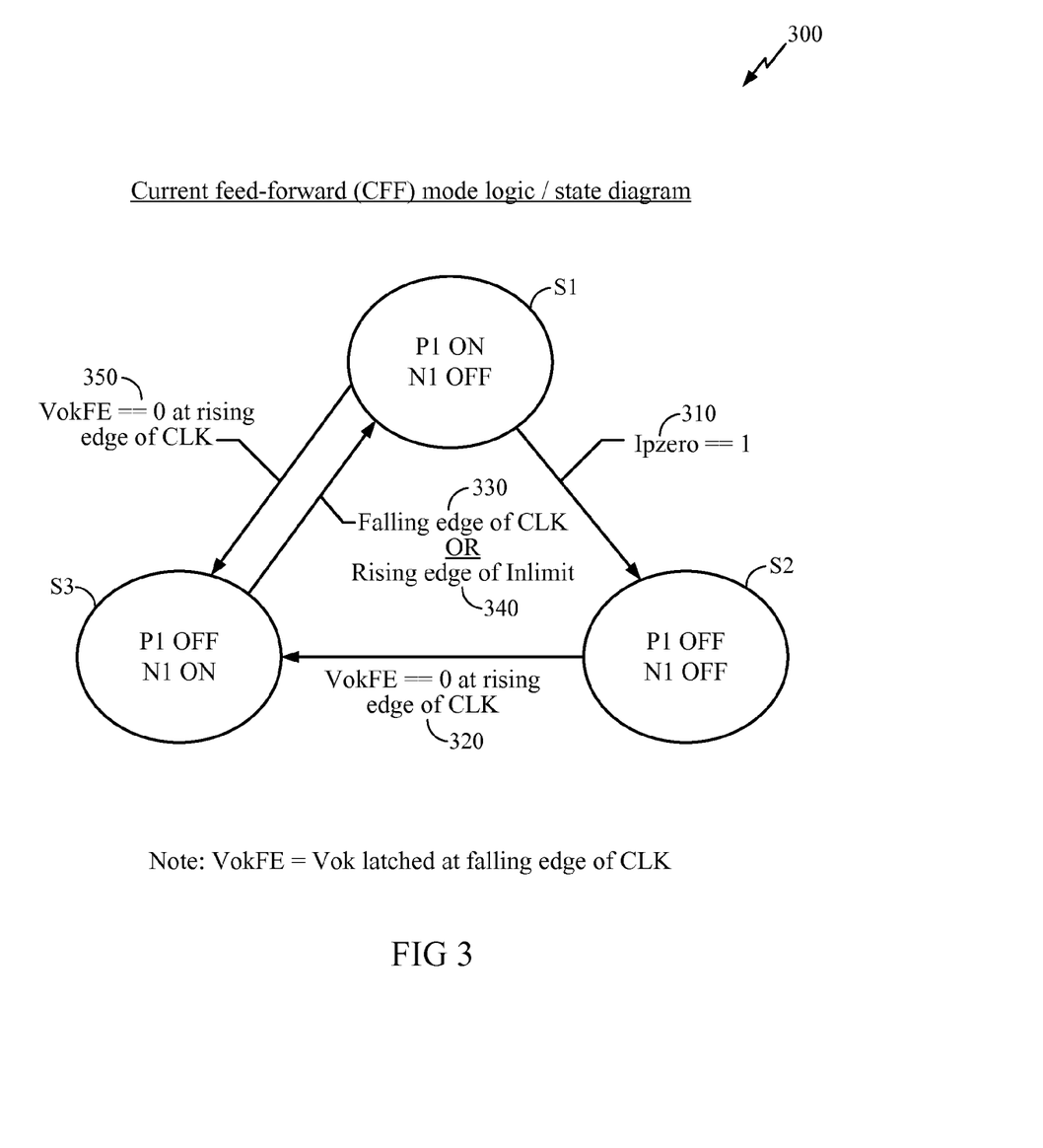
FIG. 3 illustrates an exemplary embodiment of a state machine implemented by the logic block during a CFF mode of operation.

In particular, FIG. 3 illustrates an exemplary embodiment of a state machine 300 implemented by the logic block 210 in a CFF mode of operation. Note FIG. 3 is shown for illustrative purposes only, and is not meant to limit the scope of the present disclosure. In FIG. 3, the signal VokFE corresponds to the value of Vok latched on the falling edge of CLK.

At state S1, P1 is turned on and N1 is turned off. At state S1, if it is detected according to condition 310 that Ipzero=1, then state S1 transitions to state S2, wherein both P1 and N1 are off. Furthermore, at state S1, if it is detected that VokFE is 0 on a rising edge of CLK according to condition 350, then state S1 transitions to state S3, wherein P1 is off and N1 is on.

At state S2, if it is detected that VokFE is 0 on the rising edge of CLK according to condition 320, then state S2 transitions to state S3.

At state S3, automatically on the next falling edge of CLK according to condition 330, or automatically on the next rising edge of Inlimit according to condition 340, the state S3 transitions to state S1.

It will be appreciated that the CFF mode of current control implemented by the state machine 300 may advantageously utilize current information (e.g., current through N1) in the control mechanism to alleviate the bursty nature of the control process.

Figure 4:
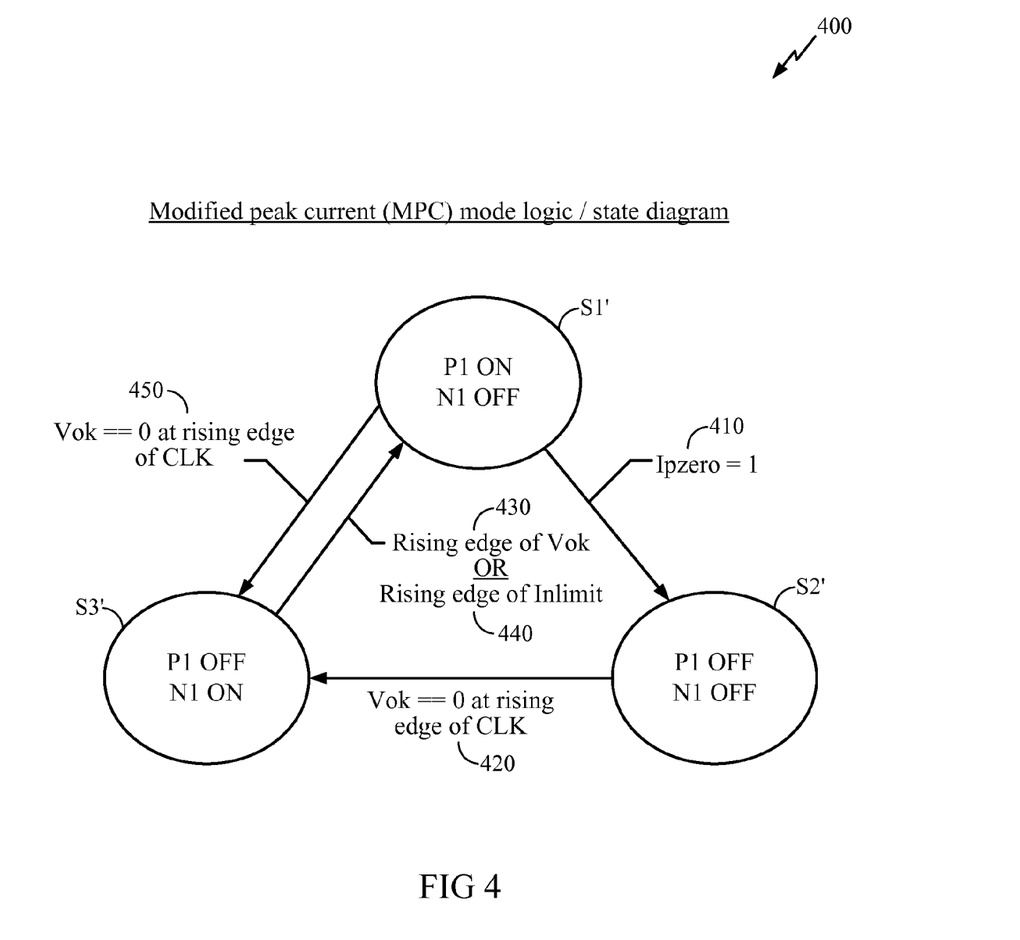
FIG. 4 illustrates an alternative exemplary embodiment of a state machine that may be implemented by the logic block during an MPC mode of operation.

FIG. 4 illustrates an alternative exemplary embodiment of a state machine 400 that may be implemented by the logic block 210 during an MPC mode of operation. Note FIG. 4 is shown for illustrative purposes only, and is not meant to limit the scope of the present disclosure.

In FIG. 4, at state S1', if it is detected according to condition 410 that Ipzero=1, then state S1' transitions to state S2', wherein both P1 and N1 are off. Furthermore, at state S1', if it is detected that Vok is 0 on a rising edge of CLK according to condition 450, then state S1' transitions to state S3'.

At state S2', if it is detected that Vok is 0 on the rising edge of CLK according to condition 420, then state S2' transitions to state S3'.

At state S3', automatically on the next falling edge of CLK according to condition 430, or automatically on the next rising edge of Inlimit according to condition 440, state S3' transitions to state S1'.

In the exemplary embodiment described hereinabove, it will be appreciated that the MPC mode state machine 400 may differ from CFF mode state machine 300 in that state transition conditions in MPC mode may be based on the real-time value of Vok, rather than on VokFE (i.e., the value of Vok latched on the falling edge of CLK), as is the case for CFF mode.

It will be appreciated that the MPC mode of current control implemented by the state machine 400 may advantageously simplify the control mechanism as compared to PC mode control, as there is no need for an error amplifier, a relatively large capacitor, or a pulse skipping comparator in MPC mode. It will further be appreciated that, as both CFF and MPC modes of operation may share the circuitry shown in FIG. 2, the system can be configured to operate in either mode simply by configuring the control logic block 210 using, e.g., a digital control signal (not shown).

Figure 5:
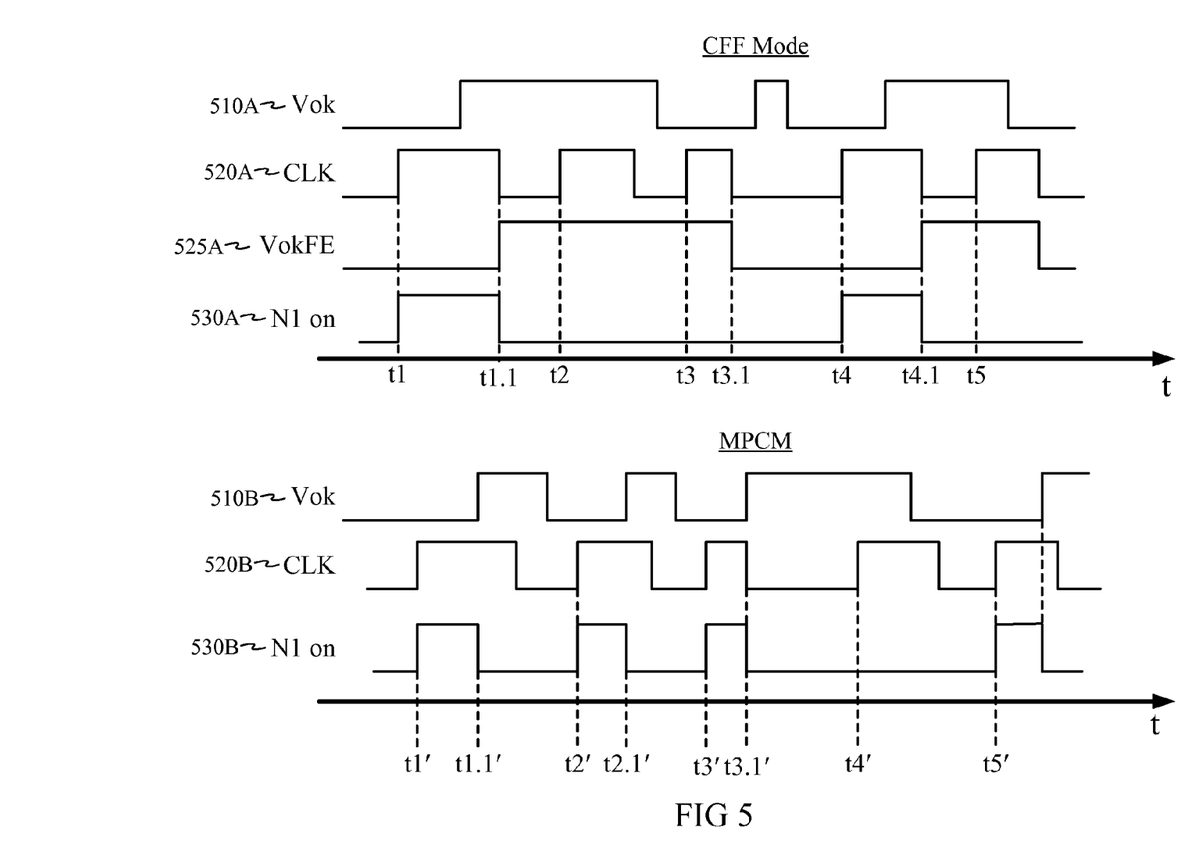
FIG. 5 illustrates a comparison of exemplary signal timing diagrams for CFF mode and MPC mode types of operation, to further illustrate the principles of the present disclosure.

FIG. 5 illustrates a comparison of exemplary signal timing diagrams for CFF mode and MPC mode types of operation, to further illustrate the principles of the present disclosure. Note FIG. 5 is shown for illustrative purposes only, and is not meant to limit the scope of the present disclosure to any particular operating conditions for a boost converter. Note the signal duty cycles and/or pulse widths in FIG. 5 are not necessarily drawn to scale. Behavior of the waveforms at certain illustrative time instants marked in FIG. 5 is further described hereinbelow.

In FIG. 5, the CFF mode waveforms 510A, 520A, 525A illustrate the signals Vok, CLK, VokFE respectively, and waveform 530A illustrates periods of time when N1 is turned on. At time t1, the system enters state S3 of FIG. 3, with N1 turned on. At time t1.1, according to (condition) 330, i.e., on the falling edge of CLK, S3 transitions to state S1, and N1 is turned off. At time t2, no transition occurs at S1 on the rising edge of CLK. Note (condition) 350 is false at t2, as the then-current value of VokFE (i.e., latched at the falling edge of CLK) is 1. At t3, no transition occurs from S1, as the then-current value of VokFE is 1. At time t4, on the rising edge of CLK, VokFE is 0, and S1 transitions to S3 again. At time t4.1, S3 again transitions to S1 due to condition 330. At time t5, no state transition occurs, as the then-current value of VokFE is 1.

FIG. 5 further illustrates waveforms 510B, 520B, and 530B, corresponding to Vok, CLK, and N1 on, respectively, for operation in MPC mode. In particular, at time t1', the system enters state S3' of FIG. 4, with N1 turned on. At time t1.1', Vok transitions high and condition 430 is true, and thus S3' transitions to S1'. At time t2', S1' transitions to S3' according to 450. At time t2.1', S3' transitions to S1' according to condition 430. At time t3', S1' transitions to S3' according to 450. At time 3.1', S3' transitions to S1' according to 430. At time t4', no transition occurs from state S1', as Vok is high on the rising edge of CLK. At time t5', S1' transitions to S3' according to 450.

Figure 6:
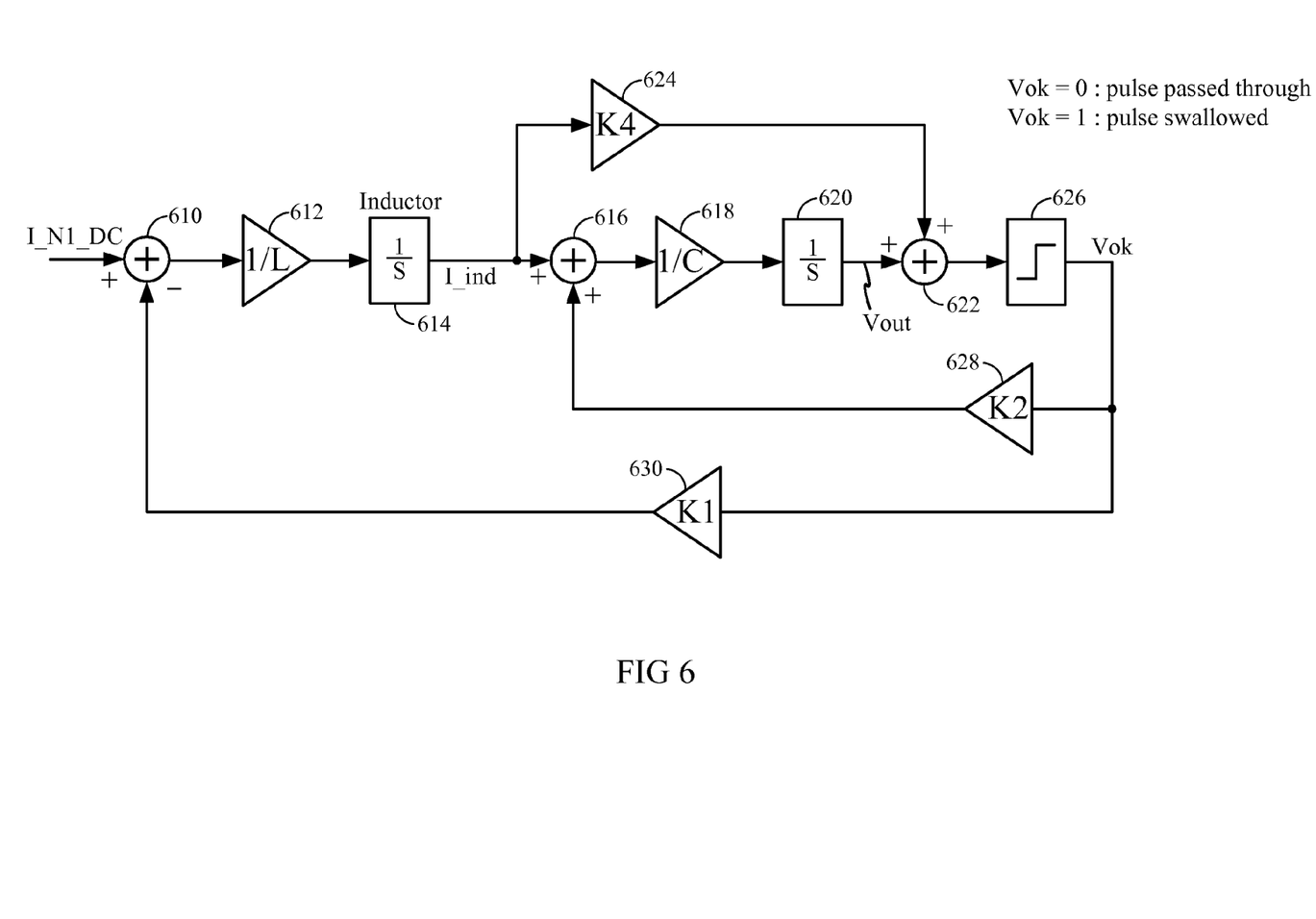
FIG. 6 illustrates an exemplary linear system further highlighting certain aspects of the present disclosure.

It will be appreciated that the CFF mode and MPC mode types of control schemes for a boost converter may be modeled as a linear system under certain assumptions. FIG. 6 illustrates an exemplary linear system 600 modeling the control schemes further highlighting certain aspects of the present disclosure. Note FIG. 6 is shown for illustrative purposes only, and is not meant to limit the scope of the present disclosure to only those embodiments that can be characterized by the linear model shown. The linear model may be useful to model the behavior of the system 200, e.g., assuming signal values are averaged over each clock cycle, switching frequency is fixed, and/or high-frequency switching ripple is ignored.

In FIG. 6, a current Lind is sampled at the output of blocks 612, 614, collectively showing the s-domain representation of the inductor L, and a gain K4 624 is applied to I_ind. At the same time, I_ind is also coupled to the output voltage Vout through blocks 618, 620, collectively showing the s-domain representation of the capacitor C, and the adder 616. Blocks 622, 624, collectively model the limiting comparator 240 in FIG. 2, and adder 622 accept as inputs Vout and the output of block 624. The output of block 626 may correspond to Vok. In an exemplary embodiment, a control algorithm according to the present disclosure may correspond to, e.g., passing through a pulse (i.e., a command to switch N1 or P1 from one state to another) if Vok=0, and swallowing the pulse if Vok=1.

In FIG. 6, parameters K1, K2 may be calculated for CFF and MPC modes separately. For example, K1, K2 may depend on, e.g., the output voltage level and/or the duty cycle of N1. Furthermore, K4 may be understood to represent the current information in Vok, and its presence in the linear system 600 will be understood to help stabilize the system. It will be appreciated that with a properly chosen value of K4, the system 600 may operate stably over a wide range of frequencies.

One of ordinary skill in the art will appreciate that the linear model 600 may be implemented in different ways in a switched-mode boost converter, e.g., using alternative circuitry from that shown in FIG. 2. For example, in FIG. 2 it may be seen that Vref=Vok_th-g1*I_N1. In an alternative exemplary embodiment, the inputs to the comparator 240 may be alternately configured to achieve the same behavior for the output Vok of comparator 240. For example, in an alternative exemplary embodiment (not shown), Vok_th may instead be coupled to the negative (−) input of the comparator 240, while the positive (+) input of comparator 240 may instead be coupled to Vout*β+g1*I_N1. Such alternative exemplary embodiments are contemplated to be within the scope of the present disclosure.

Certain exemplary embodiments have been described wherein the current I N I through N1 is processed to generate a binary output Vok or VokFE for the control logic block 210. For example, as seen in FIG. 2, comparator 240 compares Vref (which is a function of I_N1) with Vout·p to generate a binary function Vok of I_N1. However, it will be appreciated that in alternative exemplary embodiments, the control logic block 210 may alternatively or in addition utilize other general functions (e.g., analog or other digital functions) of I_N1 to control the operation of the boost converter. Such alternative exemplary embodiments are contemplated to be within the scope of the present disclosure.

In alternative exemplary embodiments, DC offset may be removed from the current information fed back to the control block for N1 and P1 to improve the performance of the control algorithm. It will be appreciated that removing the DC offset may advantageously improve the accuracy of the system.

Figure 7:
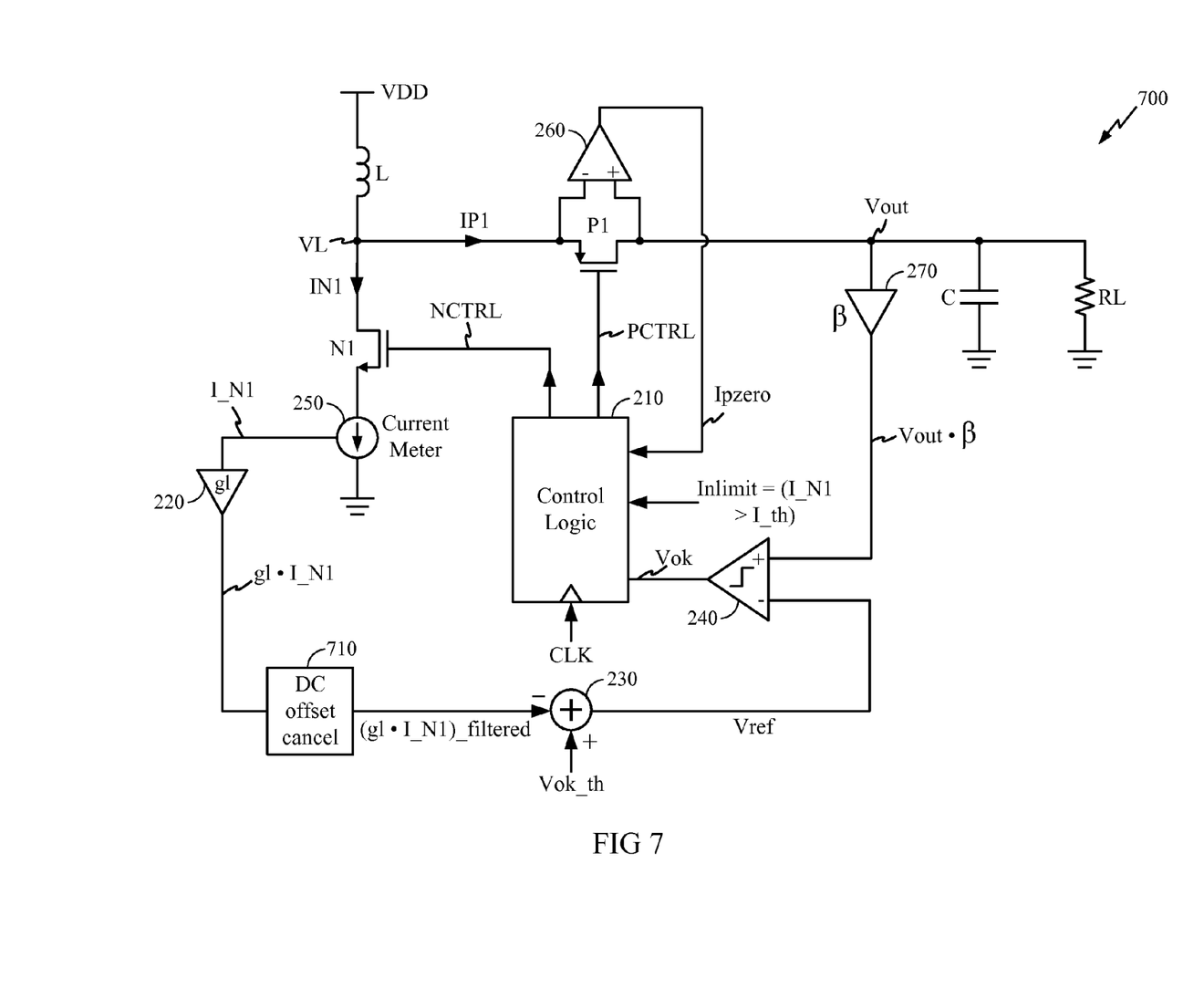
FIG. 7 illustrates an exemplary embodiment of a boost converter control scheme according to the present disclosure, wherein an additional DC offset cancellation block is provided.

FIG. 7 illustrates an exemplary embodiment 700 of a boost converter control scheme according to the present disclosure, wherein an additional DC offset cancellation block 710 is provided. In FIG. 7, block 710 is configured to cancel DC offset in the signal gl·I_N1, e.g., by estimating the average (DC) value of the input and subtracting it from the input to generate the output, denoted (gl·I_N1)_filtered.

Figure 8:
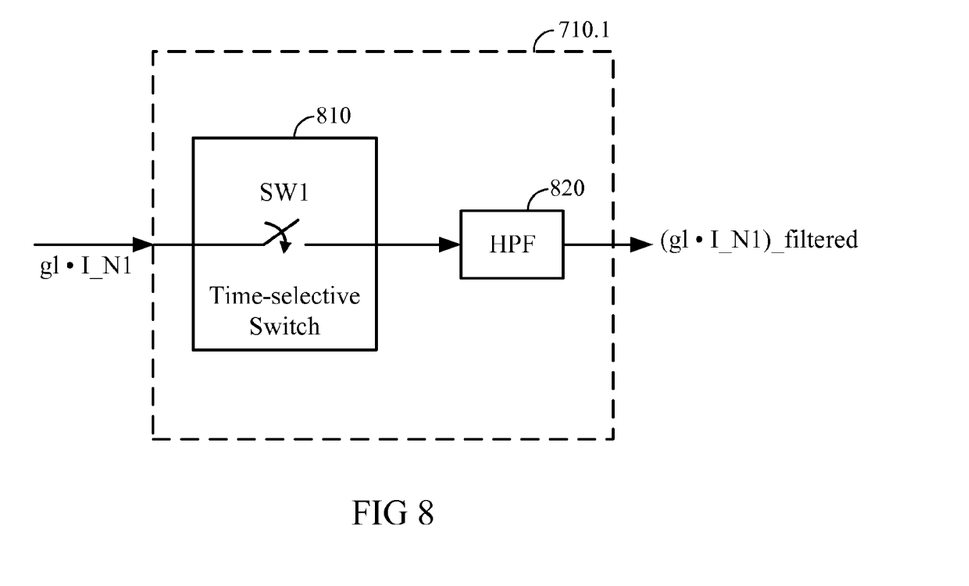
FIG. 8 illustrates an exemplary embodiment of the block, wherein a time-selective switch selectively couples g1·I_N1 to a high-pass filter (HPF).

FIG. 8 illustrates an exemplary embodiment 710.1 of the block 710, wherein a time-selective switch 810 selectively couples gl·I_N1 to a high-pass filter (HPF) 820. Note the switch 810 may be activated according to a plurality of different schemes. For example, gl·I_N1 may be averaged over an entire clock period, in which case the switch 810 may be closed for the entire duration of one or more periods of the clock. Alternatively, gl·I_N1 may be averaged only over the time when N1 is on, in which case the switch 810 may be closed only when N1 is on. Alternatively, gl·I_N1 may be averaged over a short time period near the N1 peak current, in which case the switch 810 may be closed only during a time period corresponding to N1 peak current. In an exemplary embodiment, the determination of when there is peak current in N1 may be made using a peak current sensor that may be readily designed by one of ordinary skill in the art in light of the description given hereinabove. It will be appreciated that all such exemplary embodiments are contemplated to be within the scope of the present disclosure.

In alternative exemplary embodiments, estimates of the DC value of gl·I_N1 or I_N1 may be generated using alternative techniques not explicitly described herein. Such alternative exemplary embodiments are contemplated to be within the scope of the present disclosure.

Figure 9:
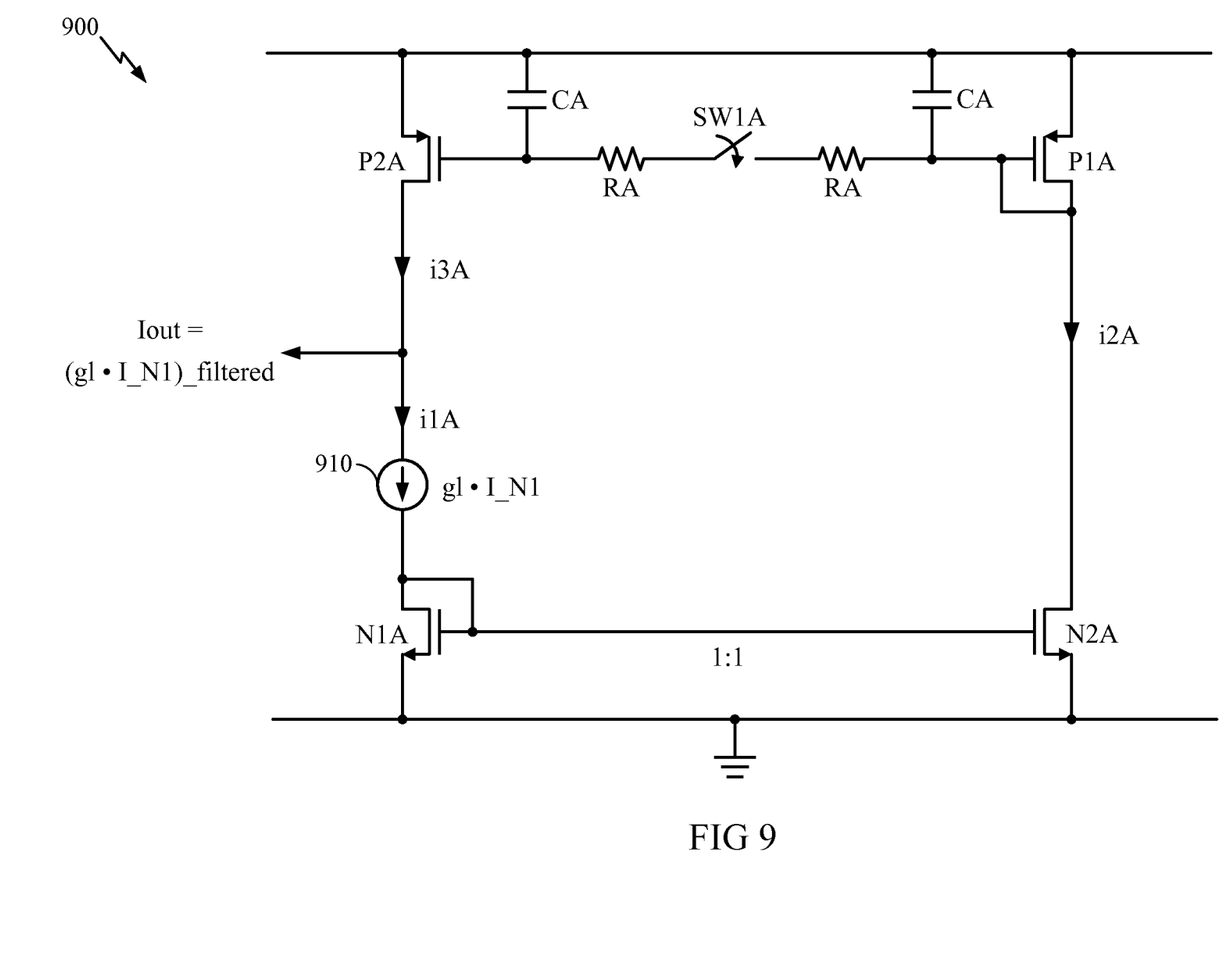

FIG. 9 illustrates an exemplary circuit implementation 900 of a scheme for averaging I_N1 when N1 is on. The circuitry 900 may be used to generate, e.g., the signal (gl·I_N1)_filtered from gl·I_N1 according to the present disclosure. It will be appreciated that FIG. 9 corresponds to a circuit implementation of the DC cancellation scheme shown in FIG. 8.

In FIG. 9, a copy of the current gl·I_N1, or i1A, is provided to transistor N1A using current source 910, and mirrored by N2A according to a 1:1 ratio. The current i2A through N2A is provided to P1A. When switch SW1A is closed, the gate of P1A is coupled to the gate of P2A, which generates a current i3A. The R-C network coupling the gates of P1A and P2A, including RA and CA, effectively low-pass filters the gate voltages of P1A, P2A, and the resulting current i3A is thus a low-pass filtered version of i1A. Correspondingly, Iout, which represents i1A subtracted from i3A, is a high-pass filtered version of i1A.

Figure 10:
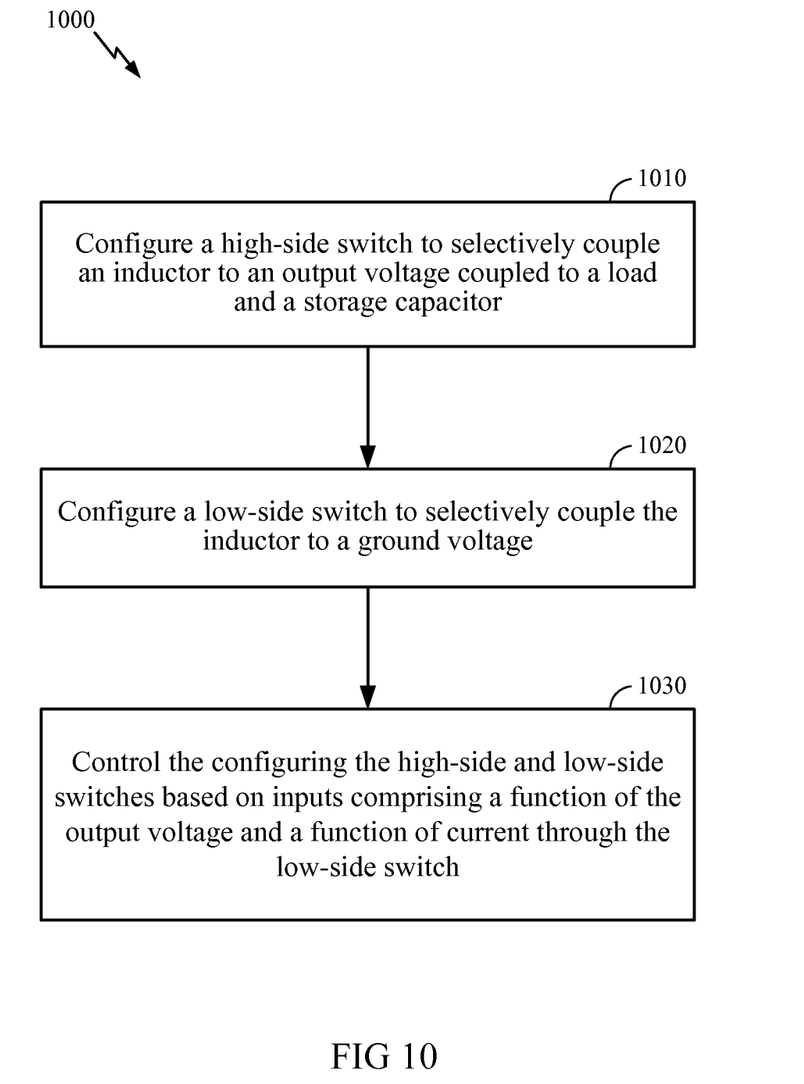
FIG. 10 illustrates an exemplary embodiment of a method according to the present disclosure.

FIG. 10 illustrates an exemplary embodiment 1000 of a method according to the present disclosure. Note FIG. 10 is shown for illustrative purposes only, and is not meant to limit the scope of the present disclosure to any particular method shown.

At block 1010, a high-side switch is configured to selectively couple an inductor to an output voltage coupled to a load and a storage capacitor.

At block 1020, a low-side switch is configured to selectively couple the inductor to a ground voltage.

At block 1030, the configuring the high-side switch and the low-side switch is controlled based on inputs comprising a function of the output voltage and a function of current through the low-side switch.

Figure 11:
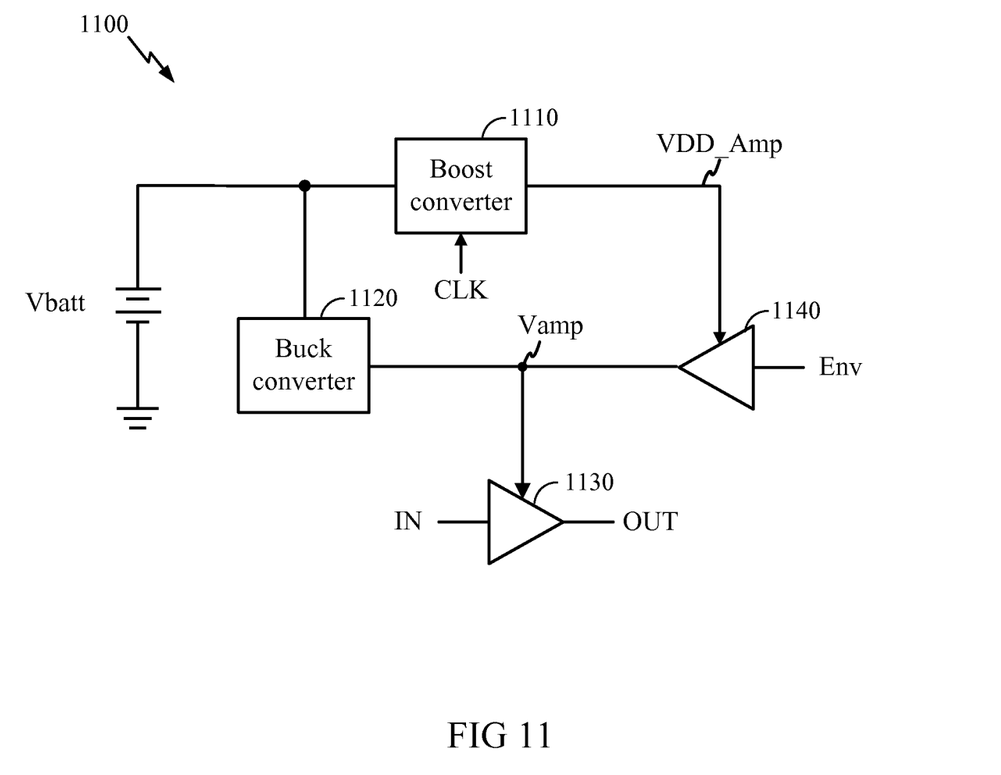
FIG. 11 illustrates an alternative exemplary embodiment of the present disclosure, wherein the boost converter techniques disclosed herein are utilized in an envelope tracking (ET) system for a radio-frequency (RF) power amplifier.

FIG. 11 illustrates an alternative exemplary embodiment of the present disclosure, wherein the boost converter techniques disclosed herein are utilized in an envelope tracking (ET) system 1100 for a radio-frequency (RF) power amplifier. Note FIG. 11 is shown for illustrative purposes only, and is not meant to limit the scope of the present disclosure to any particular implementation of an ET system. For example, the techniques described hereinabove may readily be applied to non-ET systems, and such alternative exemplary embodiments are contemplated to be within the scope of the present disclosure.

In FIG. 11, a power amplifier (PA) 1130 receives an input voltage IN and generates an amplified output voltage OUT. A voltage Vamp is provided to the PA 1130 as a supply voltage. Vamp is generated at least in part by an amplifier 1140, which may be a linear amplifier. The amplifier 1140 may amplify a voltage Env which tracks the envelope of the PA output voltage OUT. The amplifier 1140 is supplied by a voltage VDD_Amp generated by the boost converter 1110. The boost converter 1110 is supplied with a clock signal (CLK).

A buck converter 1120 is further coupled to Vamp of PA 130. The buck converter 1120 may convert Vbatt to a level Vamp lower than Vbatt. Note the buck converter 1120 may generate a level of Vamp less than Vbatt according to principles of operation not shown in FIG. 11 but known in the art, e.g., using a plurality of switches alternately configured to charge and discharge an inductor to generate a stepped-down output voltage Vamp. It will be appreciated that the buck converter 1120 may supply, e.g., the low-frequency content of the power supply to the PA 1130, while the amplifier 1140 may supply higher-frequency content of the power supply to the PA 1130 arising from, e.g., fluctuations in the envelope of the PA output voltage. Vamp may be maintained at a level sufficient to ensure linear operation of the PA 1130, i.e., provided with sufficient "headroom," while reducing unnecessary DC power consumption.

In an exemplary embodiment, the boost converter 1110 in the ET system 1100 may incorporate the boost converter architecture 200 and/or the control techniques, e.g., CFF or MPC modes of operation, described hereinabove with reference to, e.g., FIGS. 2, 3, and 4. In particular, the input voltage IN to the power amplifier 1130 may correspond to any of a plurality of signal waveforms, e.g., transmit waveforms having characteristics as specified according to the Long-Term Evolution (LTE) wireless standard. To accommodate different LTE signal waveforms, the ET system 1100 may be required to vary the frequency of CLK over a large range, e.g., to accommodate the specific signaling characteristics of each type of LTE waveform. It will be appreciated that the boost converter control techniques described hereinabove may readily be adapted to accommodate such a wide range of CLK frequencies, e.g., the states and state transitions specified in FIGS. 3 and 4 may generally accommodate CLK signals of any suitable frequency. Such exemplary embodiments of the present disclosure in an ET system are contemplated to be within the scope of the present disclosure.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the exemplary aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary aspects of the invention.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary aspects, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary aspects is provided to enable any person skilled in the art to make or use the invention. Various modifications to these exemplary aspects will be readily apparent to those skilled in the art, and the generic principles defined herein may be applied to other exemplary aspects without departing from the spirit or scope of the invention. Thus, the present disclosure is not intended to be limited to the exemplary aspects shown herein but is to be accorded the widest scope consistent with the principles and novel features disclosed herein.

The invention claimed is:

1. An apparatus comprising:
   a control logic block configured to control low-side and high-side switches coupled to an inductor, wherein:
   the high-side switch is controlled to selectively couple the inductor to an output voltage coupled to a load and a storage capacitor;
   the low-side switch is controlled to selectively couple the inductor to a ground voltage; and
   the control logic block is configured to control the switches based on inputs comprising a function of the output voltage and a function of current through the low-side switch; and the apparatus further comprising:
   a comparator configured to generate a comparator output via a comparison of the function of the output voltage to a reference voltage comprising a difference between a threshold voltage and the function of current through the low-side switch; wherein:
   when a digital control signal is set to a first mode, the control logic block is configured to turn on the low-side switch based on a latched value of the comparator output; and
   when the digital control signal is set to a second mode, the control logic block is configured to turn on the low-side switch based on a value of the comparator output.

2. The apparatus of claim 1, wherein, when the digital control signal is set to the first mode, the control logic block is configured to:
   turn on the low-side switch in response to the latched value of the comparator output being a first logical value on a first edge type of a clock signal, and further wherein the latched value of the comparator output is latched on a second edge type of the clock signal.

3. The apparatus of claim 2, the load comprising an amplifier, the apparatus further comprising:
   a power amplifier configured to amplify an input voltage to generate an output voltage, the amplifier configured to amplify a signal corresponding to an envelope of the power amplifier output voltage to supply the power amplifier;

wherein the input voltage is configurable to correspond to any of a plurality of transmit signal waveform types, and the clock signal is configurable to support a plurality of frequencies corresponding to the plurality of transmit signal waveform types.

4. The apparatus of claim 2, the first edge type of the clock signal comprising a rising edge of the clock signal, the second edge type of the clock signal comprising a falling edge of the clock signal, the first logical value comprising a logical value of low, wherein, when the digital control signal is set to the first mode, the control logic block is further configured to:
turn off the low-side switch in response to a falling edge of the clock signal.

5. The apparatus of claim 1, wherein the control logic block is further configured to:
turn off both the low-side switch and the high-side switch in response to the current through the high-side switch being less than or equal to zero.

6. The apparatus of claim 1, wherein the control logic block is further configured to:
turn on the low-side switch in response to the value of the comparator output being a first logical value on a first edge type of a clock signal; and
turn off the low-side switch in response to a signal comprising the difference between the function of current through the low-side switch and a threshold current.

7. The apparatus of claim 1, further comprising a direct current (DC) offset cancellation block configured to subtract from the function of current through the low-side switch an average of said function prior to generating the reference voltage.

8. The apparatus of claim 7, wherein the average of said function of current through the low-side switch is computed using a peak value or over a period of a clock signal.

9. The apparatus of claim 7, the DC offset cancellation block comprising:
first and second mirror NMOS transistors;
first and second mirror PMOS transistors coupled to the first and second mirror NMOS transistors, respectively;
a switch configured to selectively couple gates of the first and second minor PMOS transistors; and
a low-pass filter coupled to gates of the first and second minor PMOS transistors when the switch is selectively closed; wherein a copy of the function of current through the low-side switch is coupled to a drain of the first mirror NMOS transistor, and the current through a drain of the first mirror PMOS transistor is subtracted from current through the drain of the first minor NMOS transistor to generate an output of the DC offset cancellation block.

10. A method comprising:
configuring a high-side switch to selectively couple an inductor to an output voltage coupled to a load and a storage capacitor;
configuring a low-side switch to selectively couple the inductor to a ground voltage;
controlling the configuring the high-side switch and the low-side switch based on inputs comprising a function of the output voltage and a function of current through the low-side switch;
subtracting the function of current through the low-side switch from a threshold voltage to generate a reference voltage;
comparing the function of the output voltage to the reference voltage to generate a comparator output;
latching the comparator output on a first edge type of the clock signal to generate a latched value of the comparator output;
turning on the low-side switch in response to the latched value of the comparator output being a first logical value on a second edge type of the clock signal; and
turning off the low-side switch in response to the first edge type of the clock signal.

11. The method of claim 10, further comprising:
turning off both the low-side switch and the high-side switch in response to the current through the high-side switch being determined to be less than or equal to zero.

12. The method of claim 10,
wherein the controlling the configuring comprises controlling the switches based on inputs further comprising the comparator output and a clock signal.

13. The method of claim 12, further comprising:
turning on the low-side switch in response to the value of the comparator output being a first logical value on a second edge type of the clock signal.

14. An apparatus comprising:
means for configuring a high-side switch to selectively couple an inductor to an output voltage coupled to a load and a storage capacitor;
means for configuring a low-side switch to selectively couple the inductor to a ground voltage; and
means for controlling the configuring of the high-side switch and the low-side switch based on inputs comprising a function of the output voltage and a function of current through the low-side switch;
means for subtracting the function of current through the low-side switch from a threshold voltage to generate a reference voltage;
means for comparing the function of the output voltage to the reference voltage to generate a comparator output, wherein the means for controlling the configuring comprises means for controlling the switches based on inputs comprising the comparator output and a clock signal;
means for, when a digital control signal is set to a first mode, turning on the low-side switch based on a latched value of the comparator output; and
means for, when a digital control signal is set to a second mode, turning on the low-side switch based on a value of the comparator output.

15. The apparatus of claim 14, further comprising:
means for sampling either the latched value of the comparator output or the value of the comparator output on a first edge type of the clock signal to turn on the low-side switch;
means for latching the comparator output on a second edge type of the clock signal to generate the latched value of the comparator output;
means for turning on one of the plurality of switches in response to the latched comparator output being low on a first edge type of the clock signal; and
means for turning off one of the plurality of switches in response to the second edge type of the clock signal.

16. The apparatus of claim 15, further comprising:
means for turning off the switches in response to the current through one of the switches being determined to be less than or equal to zero.

17. The apparatus of claim 14, further comprising:
means for turning on the low-side switch in response to the output of the means for comparing being low on a first edge type of the clock signal, the function of current through the low-side switch comprising a gain times a current through the low-side switch.

* * * * *